*US011184628B2*

(12) United States Patent
Iourcha et al.

(10) Patent No.: US 11,184,628 B2
(45) Date of Patent: Nov. 23, 2021

(54) TEXTURE DECOMPRESSION TECHNIQUES

(71) Applicant: ATI Technologies ULC, Markham (CA)

(72) Inventors: Konstantine Iourcha, Santa Clara, CA (US); Andrew S. C. Pomianowski, Sunnyvale, CA (US)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/257,500

(22) Filed: Jan. 25, 2019

(65) Prior Publication Data

US 2019/0174140 A1  Jun. 6, 2019

Related U.S. Application Data

(63) Continuation of application No. 15/237,134, filed on Aug. 15, 2016, now Pat. No. 10,205,956, which is a
(Continued)

(51) Int. Cl.
| | | |
|---|---|---|
| G06T 9/00 | (2006.01) | |
| H04N 19/426 | (2014.01) | |
| H04N 19/176 | (2014.01) | |
| H04N 19/119 | (2014.01) | |
| H04N 19/46 | (2014.01) | |
| H04N 19/60 | (2014.01) | |
| H04N 19/96 | (2014.01) | |

(Continued)

(52) U.S. Cl.
CPC ............ *H04N 19/426* (2014.11); *G06T 9/00* (2013.01); *H04N 19/119* (2014.11); *H04N 19/154* (2014.11); *H04N 19/176* (2014.11); *H04N 19/182* (2014.11); *H04N 19/46* (2014.11); *H04N 19/54* (2014.11); *H04N 19/60* (2014.11); *H04N 19/96* (2014.11)

(58) Field of Classification Search
None
See application file for complete search history.

(56) References Cited

U.S. PATENT DOCUMENTS

| | | |
|---|---|---|
| 5,051,840 A | 9/1991 | Watanabe et al. |
| 5,384,643 A | 1/1995 | Inga et al. |
| (Continued) | | |

FOREIGN PATENT DOCUMENTS

| | | |
|---|---|---|
| CN | 1672177 A | 9/2005 |
| GB | 2 274 754 | 8/1994 |
| WO | 99 018537 | 4/1999 |

OTHER PUBLICATIONS

Search Report and Written Opinion for International Application No. PCT/US2007/018965 dated Apr. 10, 2008 (12 pages).
(Continued)

*Primary Examiner* — Robert J Craddock
(74) *Attorney, Agent, or Firm* — Volpe Koenig

(57) ABSTRACT

A texture decompression method is described. The method comprises receiving a compressed texture block, determining a partition of pixels used for the compressed texture block, wherein the partition includes one or more disjoint subsets into which data in the compressed texture block is to be unpacked, unpacking data for each subset based on the determined partition, and decompressing each of the one or more disjoint subsets to form an approximation of an original texture block.

12 Claims, 13 Drawing Sheets

Related U.S. Application Data continuation of application No. 11/513,190, filed on Aug. 31, 2006, now Pat. No. 9,418,450.

(51) Int. Cl.
  *H04N 19/154* (2014.01)
  *H04N 19/54* (2014.01)
  *H04N 19/182* (2014.01)

(56) References Cited

U.S. PATENT DOCUMENTS

| | | |
|---|---|---|
| 5,420,639 A | 5/1995 | Perkins |
| 5,455,680 A | 10/1995 | Shin |
| 5,488,365 A * | 1/1996 | Seroussi ............... G06T 9/005 341/106 |
| 5,535,290 A | 7/1996 | Allen |
| 5,692,012 A | 11/1997 | Virtamo et al. |
| 5,768,434 A | 6/1998 | Ran |
| 5,946,417 A | 8/1999 | Bonneau et al. |
| 5,956,431 A | 9/1999 | Iourcha et al. |
| 6,031,939 A | 2/2000 | Gilbert et al. |
| 6,208,273 B1 * | 3/2001 | Dye ..................... H03M 7/30 341/51 |
| 6,545,705 B1 | 4/2003 | Sigel et al. |
| 6,658,146 B1 | 12/2003 | Iourcha et al. |
| 6,683,978 B1 | 1/2004 | Iourcha et al. |
| 6,775,417 B2 | 8/2004 | Houg et al. |
| 6,819,793 B1 | 11/2004 | Reshetov et al. |
| 6,891,793 B1 * | 5/2005 | Suzuki ................. H04L 45/00 370/217 |
| 6,975,773 B1 | 12/2005 | Govindaswamy et al. |
| 7,039,244 B2 | 5/2006 | Hong et al. |
| 7,388,993 B2 | 6/2008 | Govindaswamy et al. |
| 2003/0035477 A1 | 2/2003 | Sekiguchi et al. |
| 2003/0053706 A1 | 3/2003 | Hong et al. |
| 2004/0081357 A1 | 4/2004 | Oldcorn et al. |
| 2004/0126031 A1* | 7/2004 | Dwyer ................. H04N 19/156 382/251 |
| 2004/0228527 A1 | 11/2004 | Iourcha et al. |
| 2004/0252894 A1 | 12/2004 | Miyanohara |
| 2004/0258322 A1 | 12/2004 | Hong et al. |
| 2006/0074935 A1 | 4/2006 | Zimmerer |

OTHER PUBLICATIONS

Examination Report, dated Oct. 14, 2009, for European Patent Appln. No. 07811591.2 (4 pages).

Notification of the First Office Action, dated Jun. 28, 2010, for Chinese Patent Appln. No 200780030887.7 (7 pages).

Notification of the Second Office Action, dated Nov. 14, 2011, for Chinese Patent Appln. No. 200780030887.7 (9 pages).

Masayuki Tanimoto, Hiroshi Ohyama, Tadahiko Kimoto, Sakae Katsuyama and Toshiaki Fuji; "A New Fractal Image Coding Scheme Employing Blocks of Variable Shapes"; Sep. 1996; in Proceedings ICIP-96 (IEEE International Conference on Image Processing; 137-140).

Kauff et al., "Functional Coding of Video Using a Shape-Adaptive DCT Algorithm and an Object-Based Motion Prediction Toolbox", IEEE Transactions on Circuits and Systems for Video Technology, vol. 7, No. 1, Feb. 1997; 181-196.

Leonid Levkovich, Maslyuk et al., "Texture Compression with Adaptive Block Partitions", pp. 401-403. Proceedings of the 8th ACM International Conference on Multimedia (2000).

Ying, Tang et al.; "Importance-Driven Texture Encoding Based on Samples", IEEE, Jun. 22, 2005, pp. 169-176.

Kirenko, Ihor, "Reduction of Coding Artifacts Using Chrominance and Luminance Spatial Analysis", IEEE, 2006; 209-210.

"Intra coding Core Experiment proposal for MPEG-4 Video"; 34, Puri et al.; MPEG Meeting; Mar. 25, 1996; Florence; Firenze; (Motion Picture Expert Group or ISO/IEC JTC1/SC29/WG11); No. M077, Mar. 21, 1996 (Mar. 21, 1996), XP030030171, ISSN: 0000-0332.

Eckert et al., "Perceptual quality metrics applied to still image compression", Dec. 1998, Signal Processing 70, 177-200.

Cosman et al., Evaluating Quality of Compressed Medical Images: SNR, Subjective Rating, and Diagnostic Accuracy, Proceedings of the IEEE, vol. 82, No. 6, Jun. 1994, pp. 919-932.

Stasidski et al., A New Class of Fast Shape-Adaptive Orthogonal Transforms and Their Application to Region-Based Image Compression, Dec. 1999; pp. 16-34.

Belloulata et al., Region-Based Image Compression Using Fractals ANS Shape-Adaptive DCT, Dec. 1999, pp. 815-819.

* cited by examiner

| | | | |
|---|---|---|---|
| 0, 0, 1, 1,<br>0, 0, 1, 1,<br>0, 0, 1, 1,<br>0, 0, 1, 1, | 0, 0, 0, 1,<br>0, 0, 0, 1,<br>0, 0, 0, 1,<br>0, 0, 0, 1, | 0, 1, 1, 1,<br>0, 1, 1, 1,<br>0, 1, 1, 1,<br>0, 1, 1, 1, | 0, 0, 0, 1,<br>0, 0, 1, 1,<br>0, 0, 1, 1,<br>0, 1, 1, 1, |
| 0, 0, 0, 0,<br>0, 0, 0, 1,<br>0, 0, 0, 1,<br>0, 0, 1, 1, | 0, 0, 1, 1,<br>0, 1, 1, 1,<br>0, 1, 1, 1,<br>1, 1, 1, 1, | 0, 0, 0, 1,<br>0, 0, 1, 1,<br>0, 1, 1, 1,<br>1, 1, 1, 1, | 0, 0, 0, 0,<br>0, 0, 0, 1,<br>0, 0, 1, 1,<br>0, 1, 1, 1, |
| 0, 0, 0, 0,<br>0, 0, 0, 0,<br>0, 0, 0, 1,<br>0, 0, 1, 1, | 0, 0, 1, 1,<br>0, 1, 1, 1,<br>1, 1, 1, 1,<br>1, 1, 1, 1, | 0, 0, 0, 0,<br>0, 0, 0, 1,<br>0, 1, 1, 1,<br>1, 1, 1, 1, | 0, 0, 0, 0,<br>0, 0, 0, 0,<br>0, 0, 0, 1,<br>0, 1, 1, 1, |
| 0, 0, 0, 1,<br>0, 1, 1, 1,<br>1, 1, 1, 1,<br>1, 1, 1, 1, | 0, 0, 0, 0,<br>0, 0, 0, 0,<br>1, 1, 1, 1,<br>1, 1, 1, 1, | 0, 0, 0, 0,<br>1, 1, 1, 1,<br>1, 1, 1, 1,<br>1, 1, 1, 1, | 0, 0, 0, 0,<br>0, 0, 0, 0,<br>0, 0, 0, 0,<br>1, 1, 1, 1, |
| 0, 0, 0, 0,<br>1, 0, 0, 0,<br>1, 1, 1, 0,<br>1, 1, 1, 1, | 1, 0, 0, 0,<br>1, 1, 1, 0,<br>1, 1, 1, 1,<br>1, 1, 1, 1, | 0, 0, 0, 0,<br>0, 0, 0, 0,<br>1, 0, 0, 0,<br>1, 1, 1, 0, | 1, 0, 0, 0,<br>1, 1, 0, 0,<br>1, 1, 1, 0,<br>1, 1, 1, 1, |
| 1, 1, 0, 0,<br>1, 1, 1, 0,<br>1, 1, 1, 1,<br>1, 1, 1, 1, | 0, 0, 0, 0,<br>1, 0, 0, 0,<br>1, 1, 0, 0,<br>1, 1, 1, 0, | 0, 0, 0, 0,<br>0, 0, 0, 0,<br>1, 0, 0, 0,<br>1, 1, 0, 0, | 0, 0, 0, 0,<br>1, 1, 0, 0,<br>1, 1, 0, 0,<br>1, 1, 1, 0, |
| 1, 1, 0, 0,<br>1, 1, 1, 0,<br>1, 1, 1, 0,<br>1, 1, 1, 1, | 0, 0, 0, 0,<br>1, 0, 0, 0,<br>1, 0, 0, 0,<br>1, 1, 0, 0, | 0, 1, 1, 0,<br>0, 1, 1, 0,<br>0, 1, 1, 0,<br>0, 1, 1, 0, | 0, 0, 1, 1,<br>0, 1, 1, 0,<br>0, 1, 1, 0,<br>1, 1, 0, 0, |
| 0, 0, 0, 1,<br>0, 1, 1, 1,<br>1, 1, 1, 0,<br>1, 0, 0, 0, | 0, 0, 0, 0,<br>0, 1, 1, 1,<br>1, 1, 1, 0,<br>0, 0, 0, 0, | 1, 0, 0, 0,<br>1, 1, 1, 0,<br>0, 1, 1, 1,<br>0, 0, 0, 1, | 1, 1, 0, 0,<br>0, 1, 1, 0,<br>0, 1, 1, 1,<br>0, 0, 1, 1, |

| 0, 0, 1, 1, | 0, 0, 0, 1, | 0, 0, 0, 0, | 2, 0, 0, 0, |
| 0, 0, 1, 1, | 0, 0, 1, 1, | 2, 0, 0, 1, | 2, 2, 0, 0, |
| 0, 2, 2, 1, | 2, 2, 1, 1, | 2, 2, 1, 1, | 2, 2, 1, 1, |
| 2, 2, 2, 2, | 2, 2, 2, 1  | 2, 2, 1, 1, | 2, 1, 1, 1, |
| 0, 0, 0, 0, | 0, 0, 1, 1, | 1, 1, 2, 2, | 1, 1, 0, 0, |
| 0, 0, 0, 0, | 0, 0, 1, 1, | 1, 1, 2, 2, | 1, 1, 0, 0, |
| 1, 1, 2, 2, | 0, 0, 2, 2, | 0, 0, 0, 0, | 2, 2, 0, 0, |
| 1, 1, 2, 2, | 0, 0, 2, 2, | 0, 0, 0, 0, | 2, 2, 1, 0, |
| 0, 0, 0, 0, | 0, 0, 0, 0, | 0, 0, 0, 0, | 0, 0, 1, 2, |
| 0, 0, 0, 0, | 1, 1, 1, 1, | 1, 1, 1, 1, | 0, 0, 1, 2, |
| 1, 1, 1, 1, | 1, 1, 1, 1, | 2, 2, 2, 2, | 0, 0, 1, 2, |
| 2, 1, 2, 2, | 2, 2, 2, 2, | 2, 2, 2, 2, | 0, 0, 0, 2, |
| 0, 1, 1, 2, | 0, 1, 2, 2, | 0, 0, 1, 1, | 0, 0, 1, 1, |
| 0, 1, 1, 2, | 0, 1, 2, 2, | 0, 1, 1, 2, | 2, 0, 0, 1, |
| 0, 1, 1, 2, | 0, 1, 2, 2, | 1, 1, 2, 2, | 2, 2, 0, 0, |
| 0, 1, 1, 2, | 0, 1, 2, 2, | 1, 2, 2, 2, | 2, 2, 2, 0, |

802

TEXTURE DECOMPRESSION TECHNIQUES

CROSS REFERENCE TO RELATED APPLICATIONS

This application is a continuation of U.S. patent application Ser. No. 15/237,134 filed Aug. 15, 2016, which is a continuation of U.S. patent application Ser. No. 11/513,190, filed Aug. 31, 2006, which issued as U.S. Pat. No. 9,418,450 on Aug. 16, 2016, which are incorporated by reference as if fully set forth.

FIELD OF INVENTION

The invention relates generally to field of texture compression and decompression in computer graphics.

BACKGROUND

A texture is a one-, two- or multi-dimensional array of data items used in the calculation of the color or appearance of fragments produced by rasterization of a computer graphics scene. A texture could be image data (either photographic or computer generated), color or transparency data, roughness/smoothness data, reflectivity data, etc. Providing realistic computer graphics typically requires many high quality, detailed textures. Providing such textures can tax available computer memory and bandwidth. Texture compression can therefore significantly reduce memory and bandwidth requirements.

Texture compression has thus become a widely accepted feature of graphics hardware in general and 3D graphics hardware in particular. Indeed, forms of texture compression date back to the earliest pieces of graphics hardware. The goal of texture compression is to reduce storage and bandwidth costs on the graphics system while retaining as much of the quality of the original texture as possible. Attaining this goal, however, has proved to be complex and has generated several different approaches, some of which are described briefly below.

Palletization is amongst the oldest forms of texture compression. Its roots date back to the earliest days of color computer graphics. Typically, palletized formats are represented by 8 bits of data per pixel, permitting a maximum of 256 colors chosen from the complete colorspace (usually quantized to 16 or 32 bits). Some images can be well represented by this approach, but it is not uncommon for the palletizing process to generate significant visual artifacts. Palletization is clearly limited when dealing with real-world images such as photographs, where the limited set of available colors is quickly exhausted. Image space techniques such as dithering are used for improving the quality of palletized images, but are difficult to use with textures because if the texture is magnified, the desired effect of the dithering may be lost, and the dithering itself may introduce undesirable artifacts. Palletized methods have some additional attributes that can make them less attractive for implementation in graphics hardware—for instance, they introduce an indirection when looking up color values. Palletization might also require storage for multiple palettes simultaneously for multi-texturing support. Generally, the quality achieved per-bit is quite low with palletization, and it has largely been superseded by more advanced methods.

Vector Quantization ("VQ"), developed by PowerVR, is another specific texture compression technique. It works by storing a limited "codebook" of representative entries to define a texture. The codebook entries are blocks of pixels of some size (typically 2×2 or larger). For each block of pixels in the original texture, an index is stored to the codebook entry that most closely approximates the block. VQ can achieve very high compression rates (down to about 2 bits per pixel) while still retaining fair quality. Nonetheless, it shares some of the undesirable qualities of palletization with respect to texture compression. For instance, the type of artifacts introduced by VQ compression can be quite noticeable on texture images, and it frequently shows visible artifacts on some common texture contents such as smooth gradients.

The Joint Photographic Experts Group (JPEG) algorithms are another image compression technique. JPEG achieves a very high quality of compression at a low bit rate, but the compression is of a variable rate. Variable rate compression makes addressing the texture map very difficult compared to fixed-rate schemes. As a result, there has been no adoption of JPEG compression in consumer 3D graphics systems except for the limited purpose of reducing a system memory imprint. For example, JPEG compression is used on Sony's Playstation 2 to reduce the system memory footprint, but the system does not texture directly from the compressed JPEG representation.

DXTC (sometimes referred to as DXTn) is a block-based texture compression scheme has been adopted by all major hardware vendors and is the most widely used today. An extension of Block Truncation Coding (BTC), it explicitly stores two 16-bit colors per 4×4 pixel block and two other colors that are implicitly represented as being interpolants between these endpoints, with an index of 2 bits per pixel to choose the colors for the pixel block. As a result it achieves overall color compression to 4 bits per pixel. DXTC represents the original texture data quite well in the majority of cases. However, DXTC has problems with textures having many different color hues within each block. Additionally, the low precision of the endpoints and small number of interpolants can produce some noise on gradients, particularly ones that are oriented diagonally to the pixel blocks. DXTC also has problems with textures containing blocks that have multiple separate color gradients at different orientations, as accurate compression of one gradient must typically be sacrificed when mapping the points to a line through the colorspace. This happens frequently in images such as normal maps. A DXTC extension allows 4 component images (with alpha) to be represented at 8 bits per pixel.

FXT 1 is a competing compression scheme with DXTC. It essentially extends DXTC with some additional block types that can be mixed within any given image, and also provides a 4 bits per pixel compression mode for textures with alpha. The gains in image quality over DXTC were never conclusive and FXT 1 received limited industry support.

PVR-TC is a recently developed compression scheme that scales an image down to a fraction of its original size and then scales it back up to obtain a good first-approximation of the original image. Texture compression is thus achieved by storing the downscaled version and then adding some modulation to create a fairly accurate reconstruction of the original data. This texture compression scheme works well for some types of data (particularly smooth gradients), and scales reasonably even to low bit rates. However, PVR-TC has a tendency to blur images somewhat and lose high frequency details. Occasionally the PVR-TC compression also seems to introduce other artifacts such as high frequency modulation noise and ringing.

A review of current texture compression techniques and their limitations reveals a need for improvements. An ideal solution would allow compression of various types of data and would have the flexibility to make the best use of available memory and bandwidth. Additionally, traditional texture compression schemes target a specific type of texture content (e.g., JPEG for photographic images) and perform well within that set, but perform poorly as soon as presented with a type of image outside of the designated set. Another challenge is thus to broaden the scope of texture compression to adequately cover a wider base of image types.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 6A-6D illustrate an exemplary set of 64 partitions, each having five disjoint subsets.

FIG. 7 illustrates an exemplary set of 32 partitions, each having two disjoint subsets.

Figure 1:
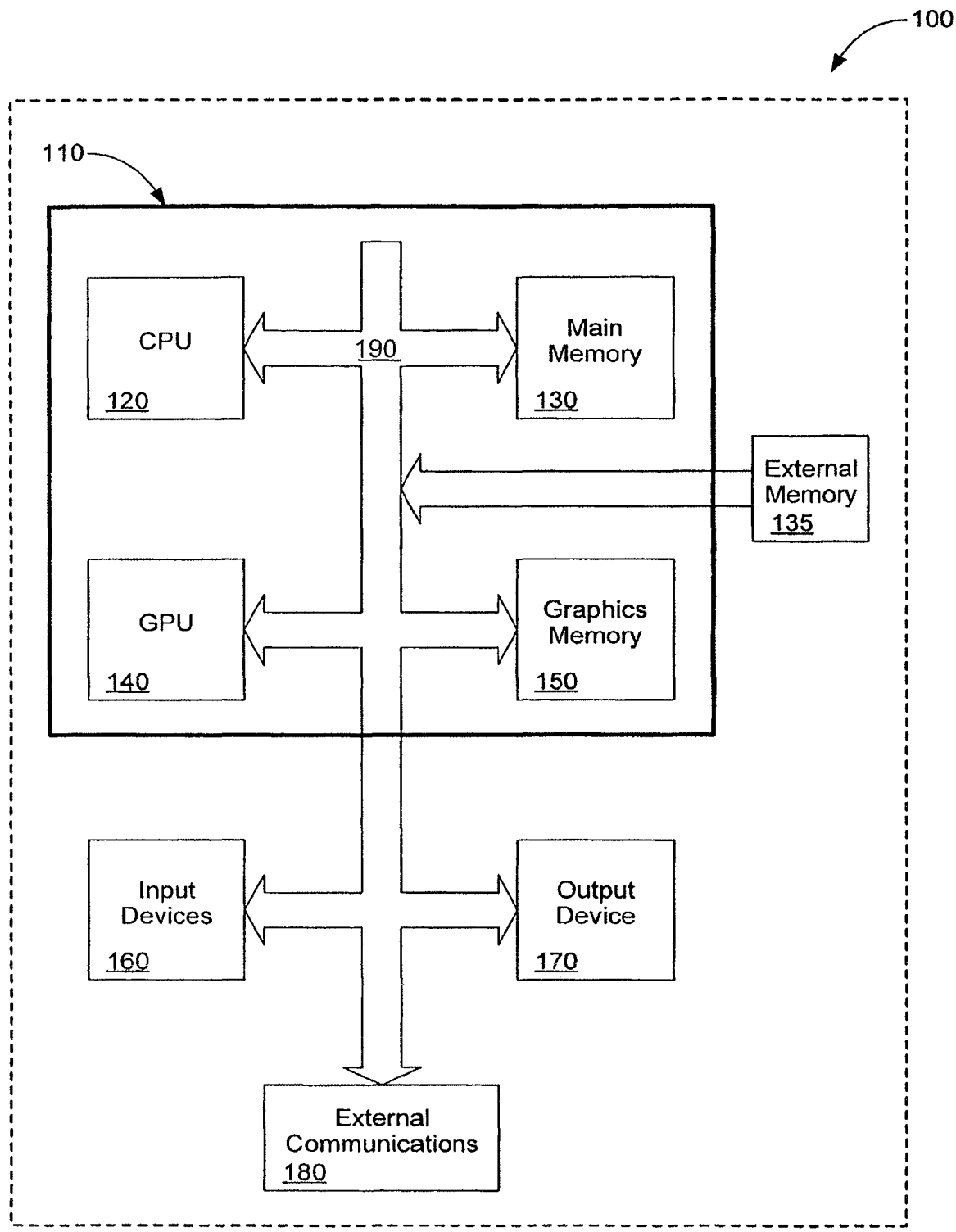
FIG. 1 illustrates an exemplary system in which the described embodiments may operate.

The present invention will now be described with reference to the accompanying drawings. In the drawings, like reference numbers indicate identical or functionally similar elements. Additionally, the left-most digits) of a reference number identifies the drawing in which the reference number first appears.

DETAILED DESCRIPTION OF THE PREFERRED EMBODIMENTS

Introduction

Textures are one-, two-, or multi-dimensional data arrays. Textures are sometimes used to enhance or change the appearance of surfaces in graphics. A "texel" is a texture element in the same way a "pixel" is a picture element. The terms "pixel" and "texel" may be used synonymously herein and simply refer a discrete unit of data—e.g., data at an (x, y) location in a frame buffer, texture buffer or other type of memory or array. The compression and decompression methods described herein may be used to compress various types of texture information including image data, picture data, transparency (alpha) information, smoothness or roughness data, or any other similarly structured data. As such, the term texture is used broadly herein to refer to the data being compressed or decompressed using the described methods.

Texture mapping is the process of applying a texture to a fragment, pixel or primitive representing a surface to be displayed. Texture mapping is often used to add realism to a scene. For example, one can apply a picture of a building façade to a polygon representing a wall. During texture mapping, a compressed texture element—e.g., a block of texels—is obtained from texture memory and represents the color or other surface characteristic of a corresponding fragment or pixel on the surface to be displayed.

As hardware and software graphics platforms support increasingly sophisticated texture mapping techniques, the scenes that developers would like to render have grown much more complex. Complex scenes thus often make greater use of textures. One of the costs of texture mapping is that the texture images often require a large amount of memory. Memory for textures can be limited, especially in hardware rendering systems where textures are placed in a dedicated memory in the graphics subsystem. Texture compression, which reduces the amount of data needed to store texture map images, allows a user to fit more texture data into available memory. The result is an ability to use more textures for higher accuracy and increased rendering quality.

There exist both. "lossy" and "lossless" texture compression schemes. A lossy texture compression scheme refers to a compression technique where it is impossible to exactly recreate the texture during decompression—i.e., the original texture data is changed irretrievably. A lossless texture compression scheme, on the other hand, refers to those techniques that permit the exact recreation of the original texture—i.e., the original texture data can be identically recovered by decompressing the texture compressed by a lossless compression technique. The present invention typically implements lossy texture compression techniques.

Lossy texture compression techniques seek a balance between texture compression ratio (i.e., the amount of compression) and image quality. A high texture compression ratio provides benefits with respect to memory use and speed, but typically sacrifices image quality. On the other hand, textures may be stored at a high level of quality, but typically at the cost of reduced compression ratios. It will be appreciated by those skilled in computer graphics that certain applications may value image quality, while others may value a high texture compression ratio (i.e., a low bit-per-pixel number). The overall goal, therefore, is to make the most efficient use of available resources while meeting the needs and limitations of the application, the user, and the user's graphics system.

As the expectations for higher levels of image quality in computer graphics increase, the limitations of DXTC and other lossy texture compression methods described above are becoming more apparent. Given that the amount of available memory and bandwidth is constantly increasing the present invention permits increased image quality with a lower compression ratio as well higher quality compression than existing methods at the same compression ratio. When going to a higher number of bits-per-pixel, one challenge is trying to achieve the same quality per bit as the schemes with higher compression ratios. To address this challenge, the present invention further refines block-based image compression techniques such as DXTC with a flexible method for pre-compression partitioning of texture blocks. The pre-compression partitioning enhances image quality by flexibly selecting partitions suitable to the characteristics of the texture block being compressed, rather than adopting the one-size-fits-all approach suggested in other methods.

Sample Environment

Before describing embodiments of the present invention in detail, it is helpful to describe an example environment in which the data compression device may be implemented. FIG. 1 illustrates a graphics system 100. The system may include, but is not limited to, a computer 110, various input devices 160 such as a keyboard or a mouse (not shown), and various output devices 170 such as a liquid crystal display (LCD) monitor or a cathode ray tube (CRT) monitor (not shown). The computer 110 may include, but is not limited to a central processing unit (CPU) 120, a graphics processing unit (CPU) 140, a main memory 130, and a graphics memory 150. As will be understood by those having ordinary skill in the art, the components may be combined in various ways. For example, the CPU and the CPU may be combined into a single device. Similarly, exemplary embodiments of the invention may combine main memory and graphics memory into a single memory. Other combinations are similarly possible.

The computer 110 may be a portable computer, a laptop computer, a desktop computer, server, mainframe, handheld device (e.g., mobile phone, camera, portable media player), digital television or the like. The main memory 130 may be random access memory (RAM) or some other storage device. For static data, the main memory may also contain read only memory (ROM). Main memory 130 may be used for storing information during execution of instructions by the CPU 120 such as processor instructions, temporary variables, or cached information. Graphics memory 150 may also consist of RAM, ROM or other storage and is primarily used for storing graphics information such as scene information and texture data. Also illustrated is an external memory or storage device 135, such as a hard disk or other storage device, that can be used to store texture data. It should be noted that textures may be stored in uncompressed or compressed format. Pre-compressed data would pass through the CPU unmodified.

The graphics system 100 may also include an external communication device 180 such as a modem, a wired or wireless network interface card, or other well-known interface devices. External communication device 180 allows a communication link to a local area network (LAN), wide area network (WAN), the Internet or any other well-known type of external network. All the elements of the graphics system 100 are typically coupled to a communications bus 190 through which information and instructions are routed.

The GPU 140 contains the graphics hardware, which typically includes a rendering pipeline for transforming scene and texture data into information ready for display. Some graphics hardware systems may include a separate pipeline that is dedicated to texture information. The CPU 140 also typically has its own local storage that holds the information to be output to a visual display device.

Figure 2:
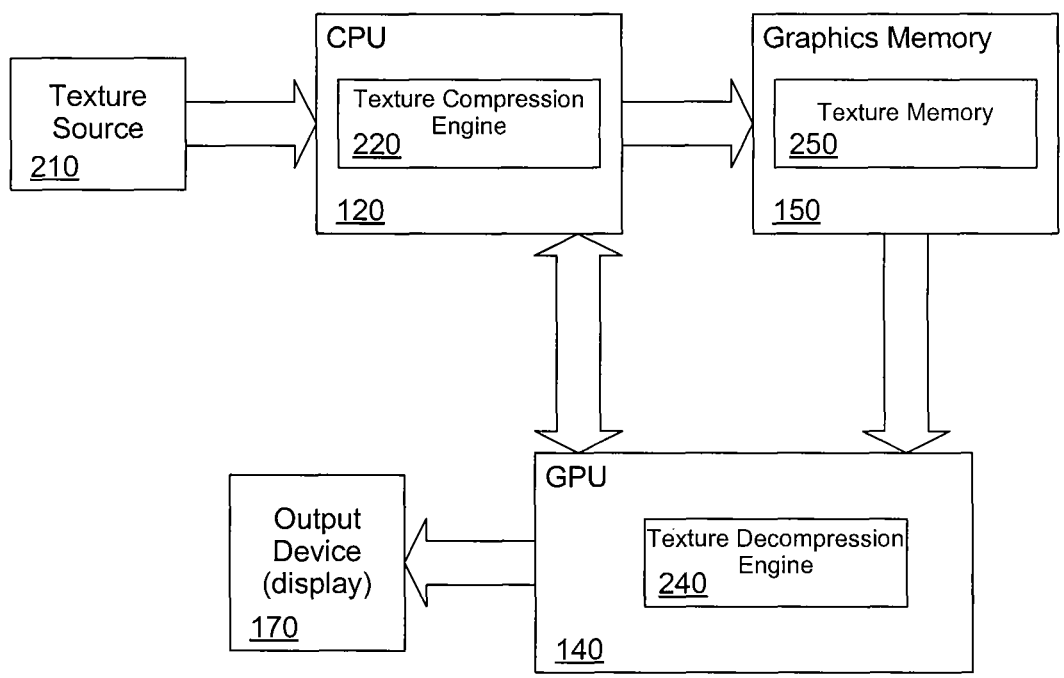
FIG. 2 illustrates the flow of texture data through an exemplary system.

FIG. 2 further illustrates the path texture data may take through an exemplary graphics system. An uncompressed texture source 210 (e.g., texture database or library) is coupled to CPU 120. Within CPU 120 is a texture compression engine 220. The texture compression engine 220 is primarily responsible for implementing the texture compression methods of the present invention using hardware, software or a combination of both.

A compressed texture may then be stored in graphics memory 150 or external memory 135, which are coupled to CPU 120. Texture data for use by the GPU 140 is stored in the graphics memory 150. In some implementations this may be a dedicated region of memory—i.e., texture memory 250. The graphics memory 150 and CPU 120 are both coupled to GPU 140. Within GPU 140 is a texture decompression engine 240. Texture decompression engine 240 is primarily responsible for decompression or decoding compressed texture data such that it can be used by GPU 140. The GPU may use this texture data to produce data used by the output device 170 or in further processing.

Compression Principles

As noted above, the present invention represents a further refinement of block-based texture compression schemes such as DXTC. Like DXTC, the basic compression algorithm implemented in a preferred embodiment divides or splits the image up into discrete blocks of pixels (e.g., 4×4 pixel or 8×8 pixel blocks) and compresses them.

However, rather than mechanistically compressing the regular texture blocks, the present invention introduces the idea of further subdividing or partitioning the block internally into "subsets" of different shape and size before compression. Each subset is then compressed in a manner similar to DXTC. Precompression subdivision addresses several image quality problems with existing DXTC compression, and results in a significant overall increase in perceived and measured quality. Furthermore, it provides improvement in the ability to compress less common types of texture data (such as non-photorealistic textures, cartoons, etc.).

Figure 3A:
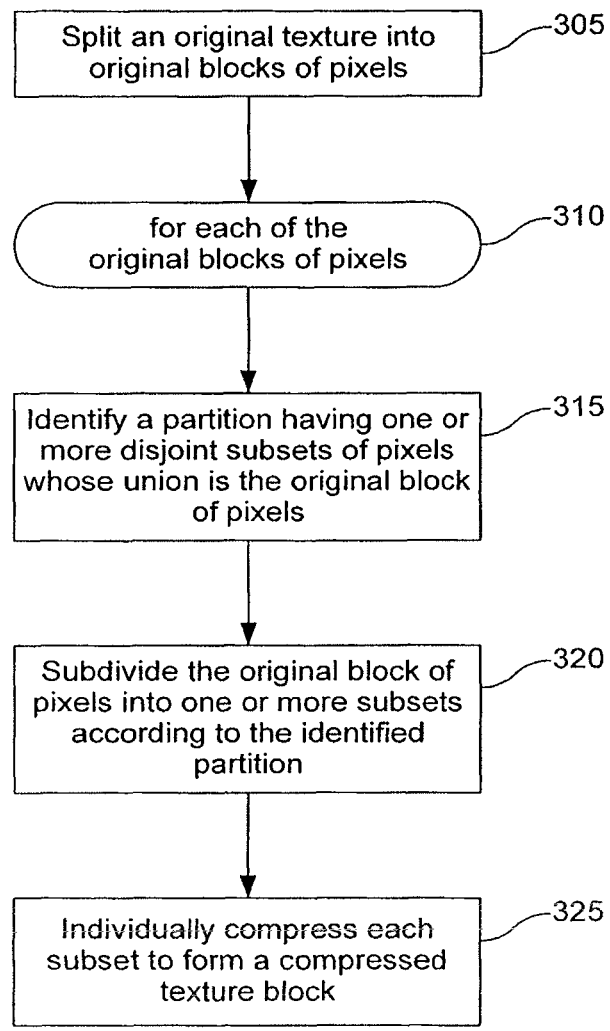
FIGS. 3A-3C are flow charts illustrating a compression method.
Figure 3B:
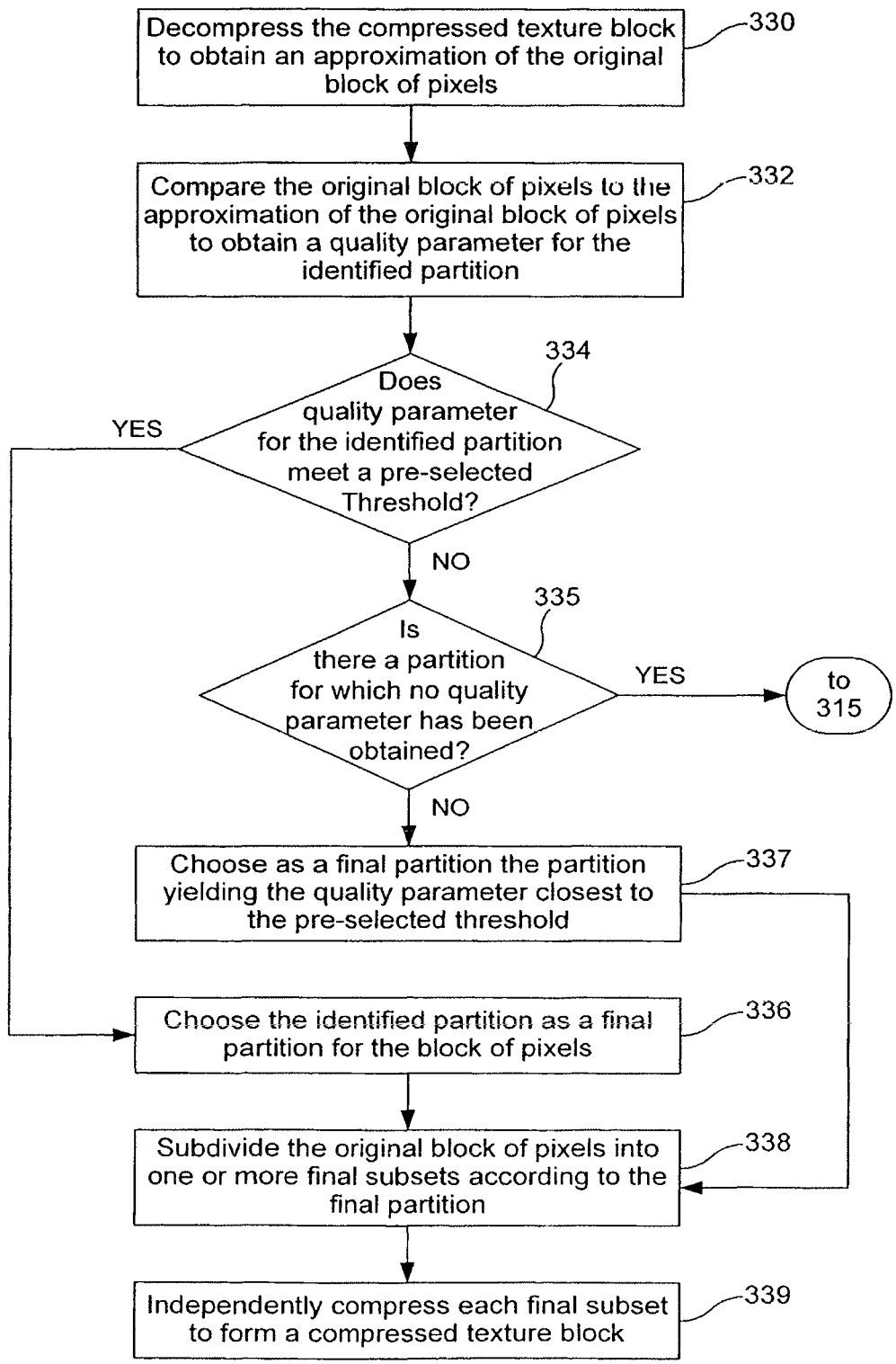
Figure 3C:
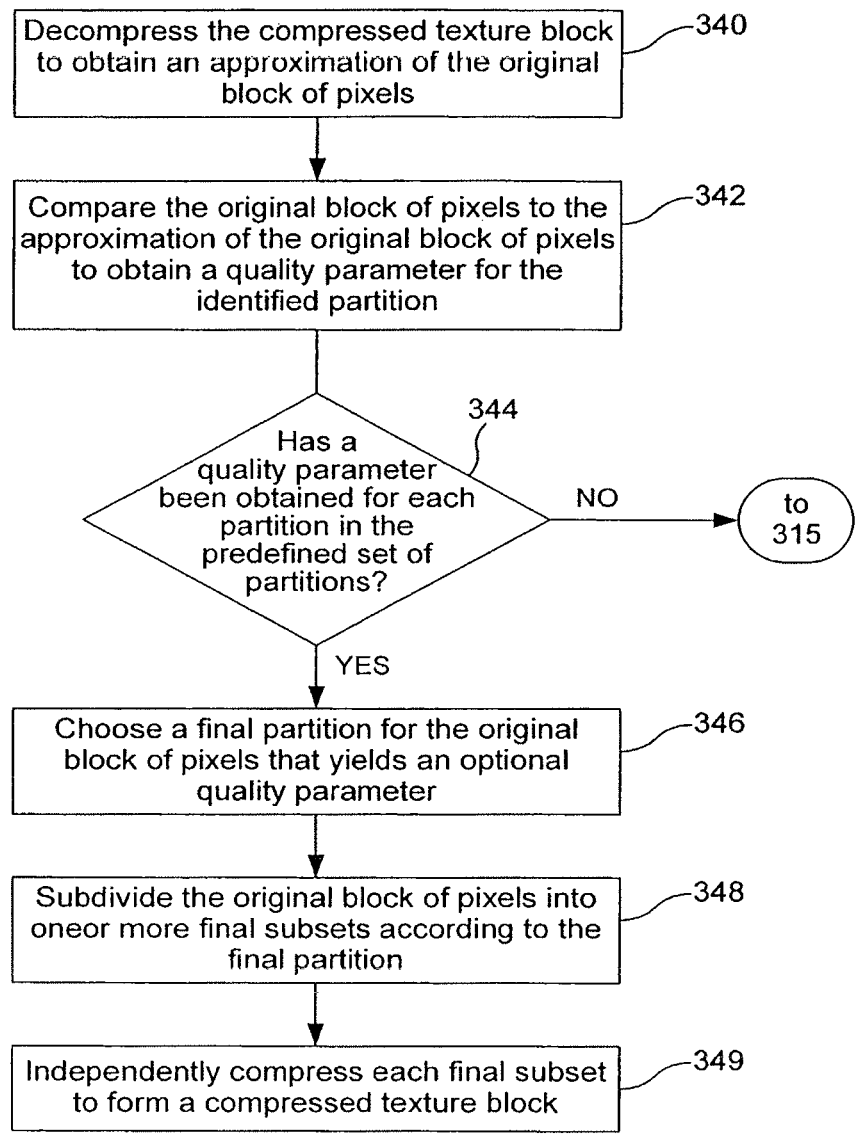

FIGS. 3A-C are flowcharts more specifically illustrating one embodiment of the present invention. Initially, an original texture to be compressed is received in a texture compression engine. As with other block-based texture compression schemes, the original texture is then split or divided into original blocks of pixels according to step 305. Typically, the original block of pixels is a square or rectangular block— e.g., 4×4 or 8×8 pixel. The size of the original block of pixels is variable, and may be selected according to user needs, application demands and/or system capabilities.

Figure 4:
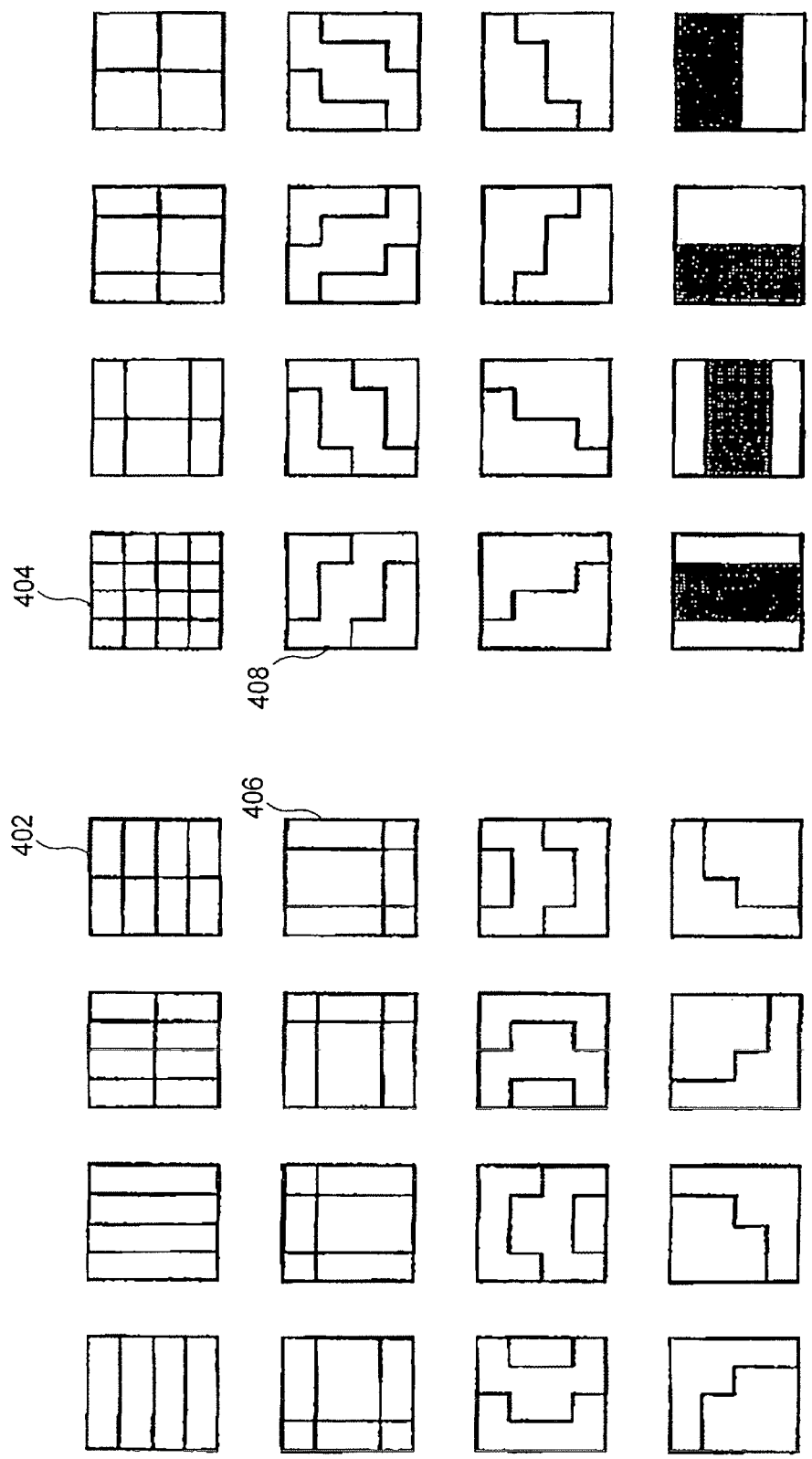
FIG. 4 illustrates various partitions.

As indicated in 310, each original block of pixels is then subjected to steps 315 through 325. According to step 315 a partition is identified that describes the manner in which the original block of pixels is to be further split. Each of the partitions define a plurality of disjoint subsets of pixels whose union is the original block of pixels. A partition can consist of a single subset, in this case the subset is identical to the single block of pixels. FIG. 4 illustrates some basic examples of the types of partitions and the subsets they contain. The size and arrangement of the subsets within a partition is completely variable—i.e., there is no restriction considering the number or configuration of the subsets except for the number of bits dedicated to defining them. For example, a partition may have 8 or 16 subsets as in partitions 402 and 404, respectively. Alternatively, a partition may have 3 or 6 subsets as in partitions 408 and 406, respectively.

Typically, the partition is selected from a pre-defined set of partitions. The number of available partitions in the pre-defined set may vary, but is limited by the number of bits in the data structure dedicated to relaying that information. For example, if there are 6 "partitionBits" dedicated to describing the partition, then the pre-defined partition set could contain up to 64 different partitions. Some embodiments could have several sets of partitions, the partitions in each set divide the block into the same number of subsets, with the set of partitions to be used (and hence the number of subsets for the block) being identified by a selector. For example, if the selector has two bits, and there are 6 partition bits, then there could be one set of 64 two-subset partitions, another set of 64 three-subset partitions, a third set of 64 four-subset partitions, and a fourth set of 64 five-subset partitions. The specific data structure for this embodiment is described in more detail below.

Figure 6A:
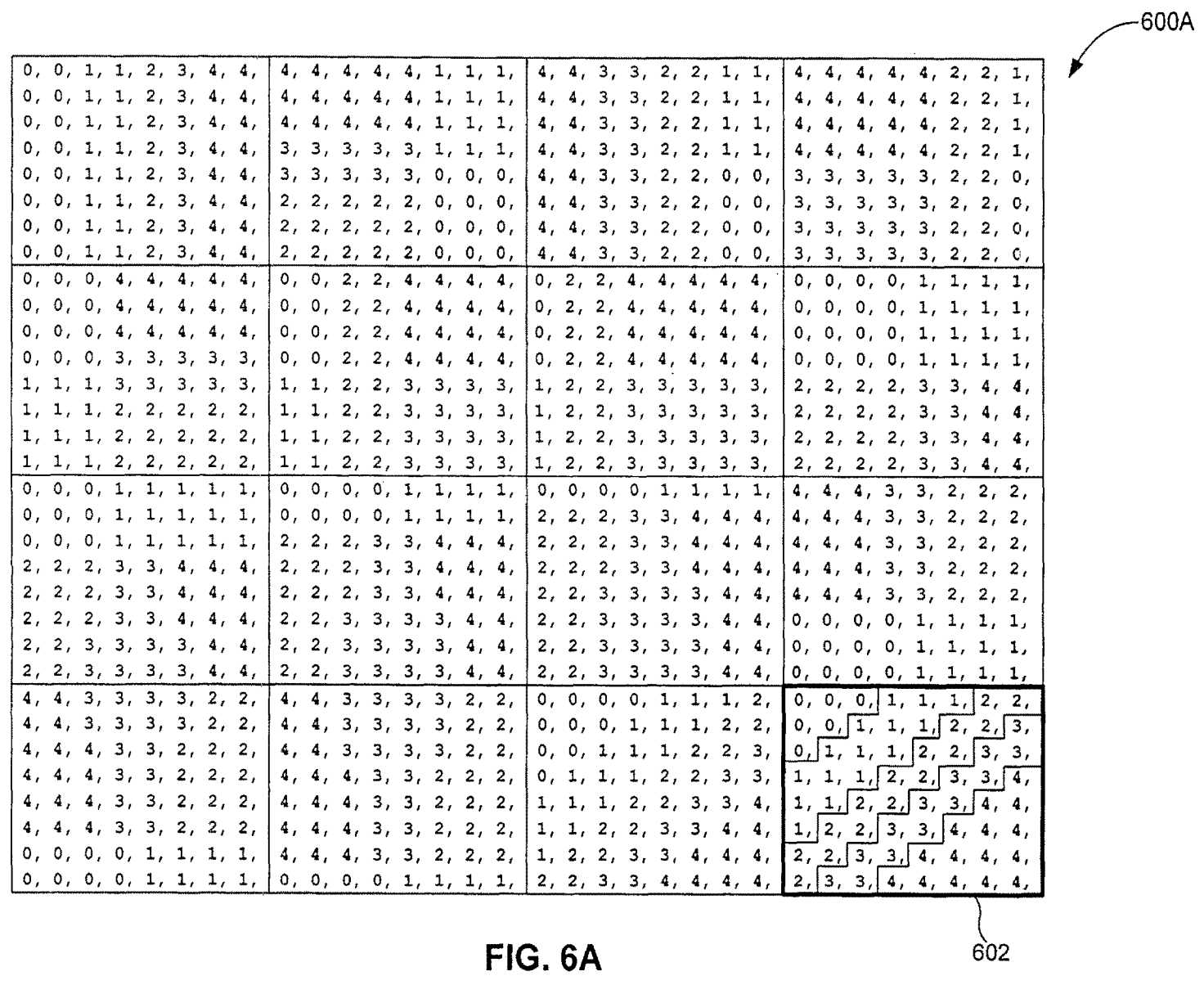
Figure 6B:
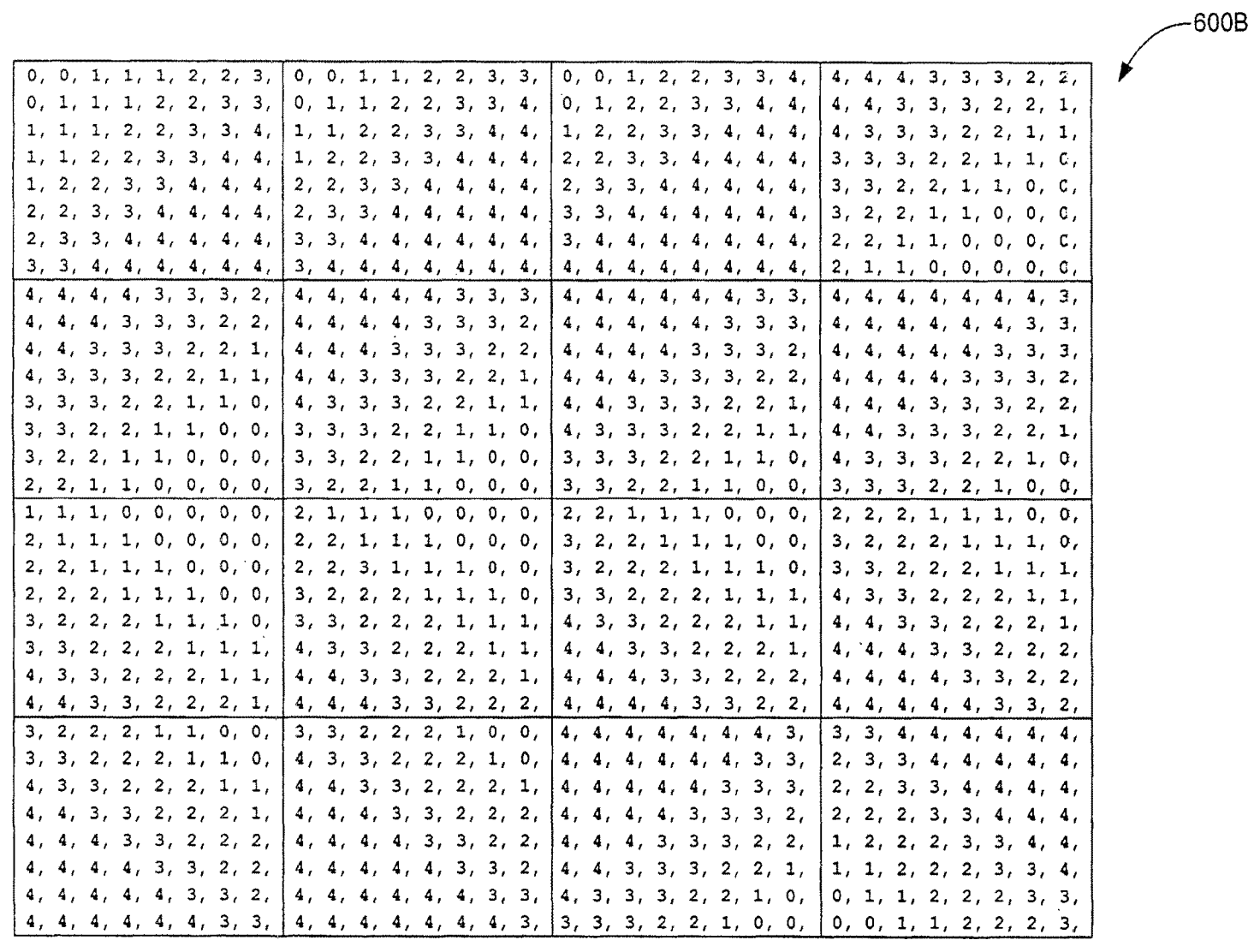
Figure 6C:
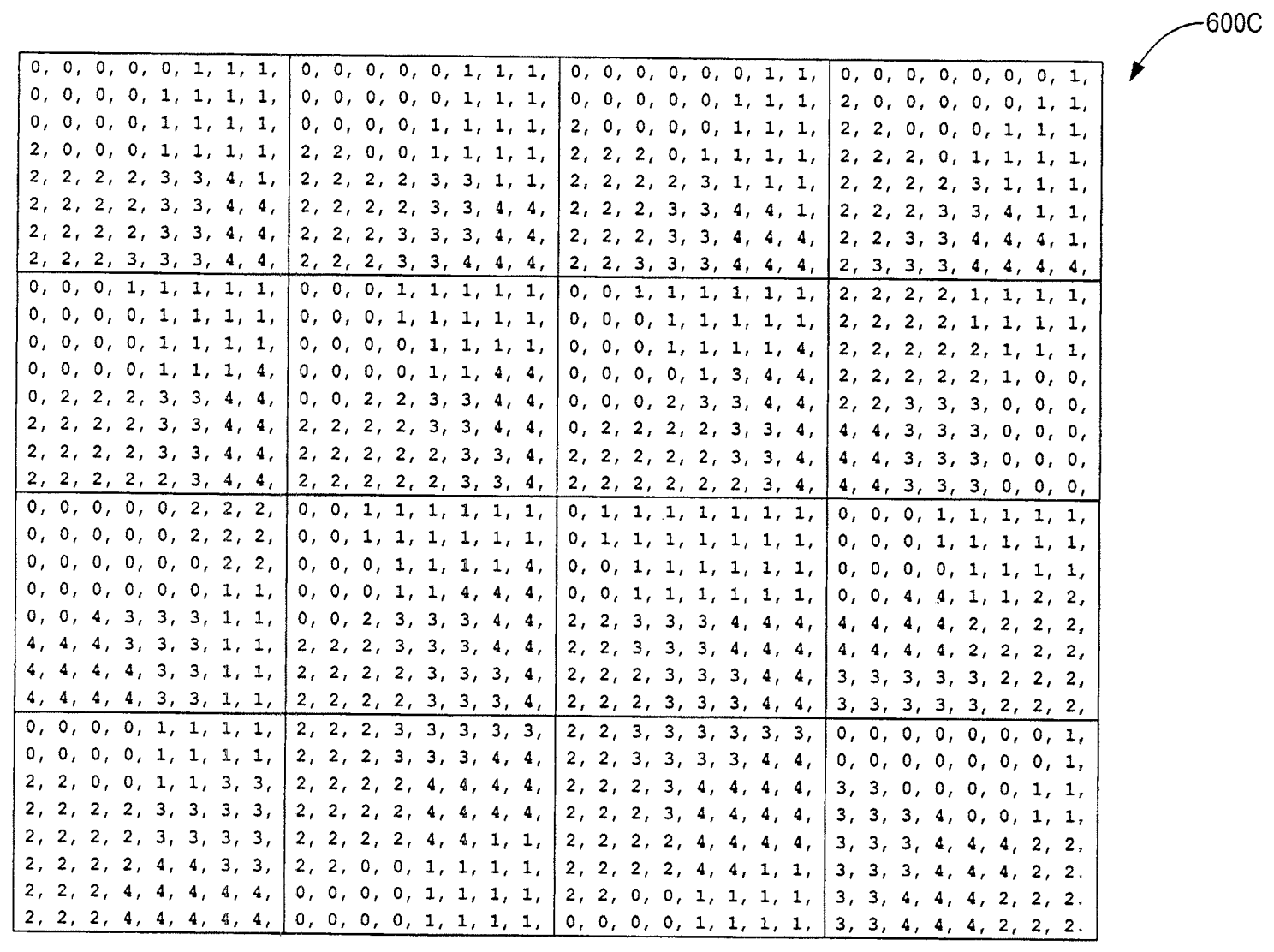
Figure 6D:
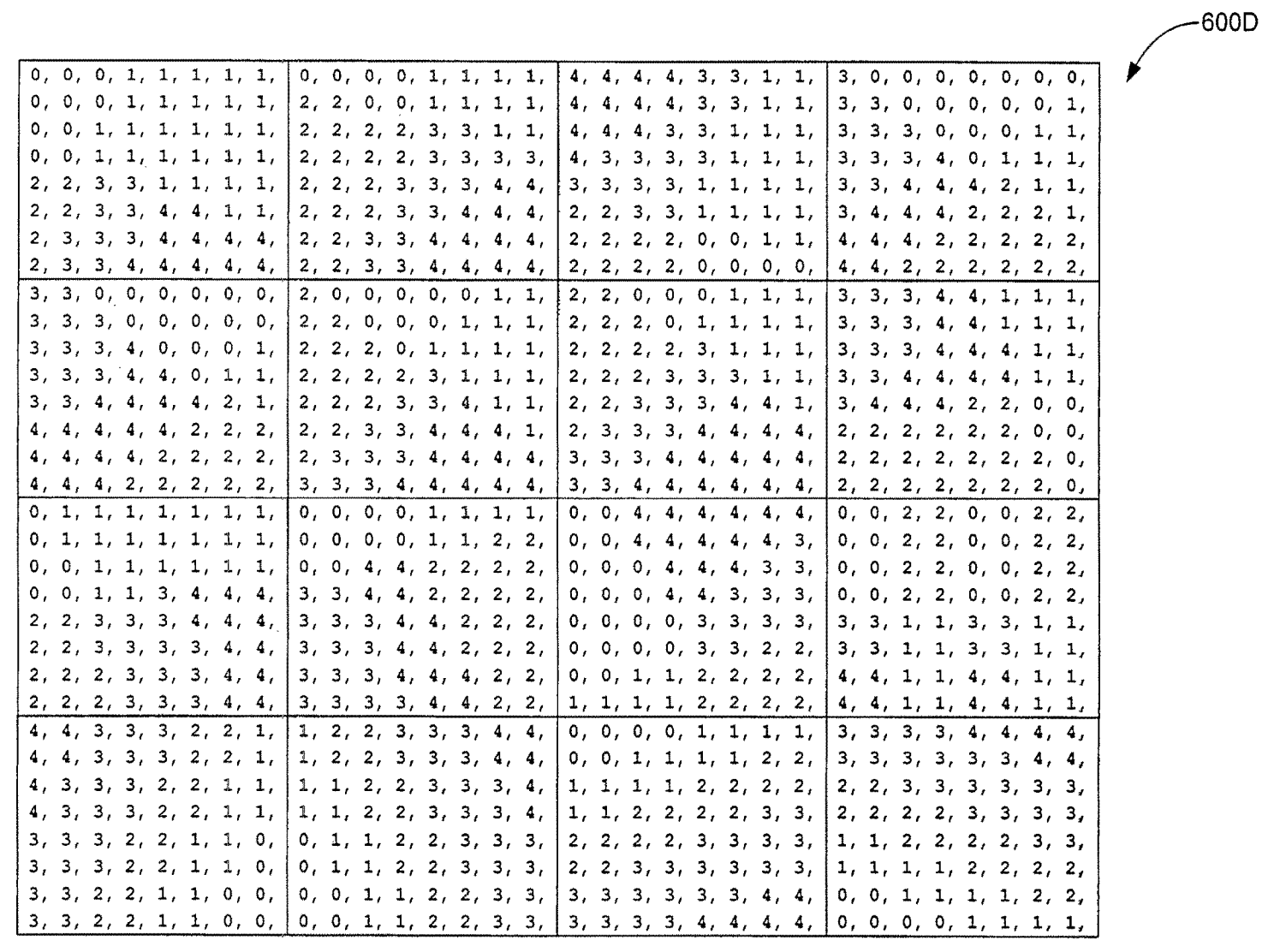

An exemplary set of 64 partitions, each having 5 subsets, is illustrated in FIGS. 6A-6D. For clarity, the complete set of partitions is illustrated over 4 pages of figures, with 16 such partitions illustrated by partition 600A in FIG. 6A. An exemplary partition 602 is shown in FIG. 6A. Therein, an 8×8 pixel block has been subdivided into 5 disjoint subsets with a first subset containing those pixels labeled 0, a second subset containing those pixels labeled 1, a third subset containing those pixels labeled 2, a fourth subset containing those pixels labeled 3, and a fifth subset containing those pixels labeled 4.

Figure 8:
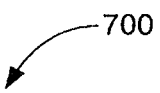
FIG. 8 illustrates an exemplary set of 12 partitions, each having three disjoint subsets.
Figure 8:

Similarly, FIG. 7 illustrates 32 partitions, each having two disjoint subsets. An exemplary partition 702 is illustrated in FIG. 7. Therein, a 4×4 pixel block 702 has been subdivided into two disjoint subsets with a first subset containing those pixels labeled 0 and a second subset containing those pixels labeled 1, FIG. 8 illustrates a set of 1.6 partitions, each of which has been subdivided into three disjoint subsets. An exemplary partition 802 is illustrated in FIG. 8. Therein, a 4×4 pixel block 802 has been subdivided into 3 disjoint subsets with a first subset containing those pixels labeled 0, a second subset containing those pixels labeled 1, and a third subset containing those pixels labeled 2.

The partition set could be of arbitrary size up to the combinatorial limit of the number of ways to partition a block. In embodiments designed for efficient encoding a more limited set of partitions will be defined in order to fit within the desired code size. An embodiment could allow a unique partition set for each texture, or it could require all textures to share the same fixed partition set. It is possible to evaluate a quality function for each original block of pixels to aid in selecting an appropriate partition. Once a partition has been identified, the original block of pixels is subdivided into one or more subsets according to the identified partition, as illustrated in step 320.

Next, according to step 325, each subset is then independently compressed to form a compressed texture block. In an embodiment, each of the subsets may be compressed using two explicit endpoint parameters that define a line in the colour space, and a plurality of implicit points on the line selected according to a predefined quantization. However, the described methods are not limited to this particular compression scheme. For example, palletization or other vector quantization compression algorithms could be implemented as well.

After the subsets of pixels have been compressed, the compressed texture block may be evaluated to further refine partition selection. Two such evaluation embodiments are illustrated in FIGS. 3B and 3C. Evaluation typically requires (i) decompression of the compressed texture block to obtain an approximation of the original block of pixels, and (ii) comparison of the original block of pixels and the approximation of the original block of pixels to obtain a quality parameter. These steps are reflected in steps 330 and 332 of FIG. 3B, and steps 340 and 342 of FIG. 3C.

The quality parameter is derived from a predefined function used to quantify a certain aspect of the decompressed texture block as it compares to the original block of pixels. For instance, the predefined function could evaluate the pixel colors in the original block of pixels as compared to the pixel colors in the approximation of the original block of pixels to derive an overall error approximation. An error approximation may be a root-mean-square (RMS) error composed of, for example, the squared sum of individual pixel color error contributions over all the pixels in the block. Alternatively, other functions may be devised, depending on the users needs. For example, the function could evaluate luminance, or transparency, or any other texture parameter deemed important by a user. As detailed below, the quality parameter is used to measure the relative success of the compression for the selected partition against other partitions, or against a pre-selected quality parameter threshold.

In the embodiment of FIG. 3B, a decision is made in step 334 as to whether the quality parameter for the identified partition meets a pre-selected threshold. If it does, then the identified partition becomes the final partition for the current block of pixels according to step 336. If the quality parameter does not meet the pre-selected threshold, then a determination is made according to step 335 as to whether partitions remain for which no quality parameter has been obtained. If such an untested partition remains, then the method returns to step 315. In this embodiment, a user can select a minimum standard of quality for the texture block compression based on a variety of parameters. In this embodiment, the quality parameter values are also tracked so that, if the threshold quality value is not achieved, then the partition yielding the best quality value can be chosen, as illustrated in step 337.

Next, in step 338, the original block of pixels is subdivided into one or more final subsets according to the final partition. The subsets from this final subdivision are then independently compressed to form a compressed texture block, as illustrated in step 339.

In an alternative embodiment, represented by FIG. 3C, the partition is identified from a predefined set of partitions. Then, a quality parameter is obtained for each partition in the set of partitions. According to step 344 of FIG. 3C, if a quality parameter has not been obtained for each partition in the predefined set of partitions, the method returns to step 315, where another partition is selected. In this embodiment, the system then selects the partition yielding an optimal quality parameter, as described in step 346. Next, in step 348, the original block of pixels is subdivided into one or more final subsets according to the final partition. The subsets from this final subdivision are then independently compressed to form a compressed texture block, as illustrated in step 349.

One of skill in the art could devise various other means for identifying and selecting an appropriate partition. Such embodiments could be tailored for the specific needs of the programmer, and depend on the particular implementation for which data compression is desired.

Decompression Principles

Figure 5:
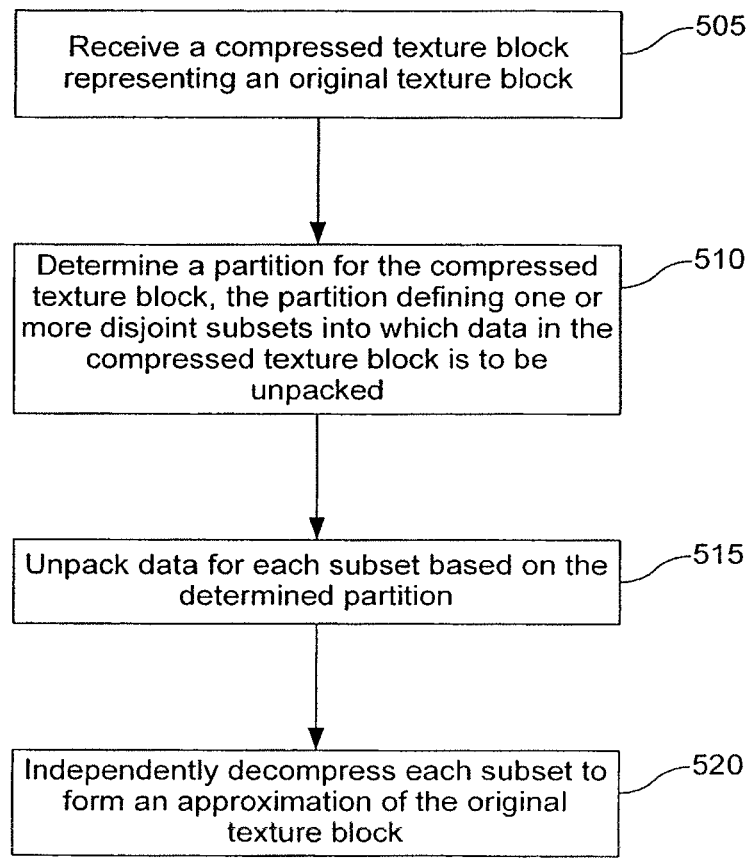
FIG. 5 is a flow chart illustrating a decompression method.

Decompression of texture blocks that have been compressed according to the present methods involves essentially working backwards. FIG. 5 is a flowchart illustrating such a decompression scheme. According to step 505, a compressed texture block is received that represents an original texture block.

The next decompression step 510 involves determining the partition that was used for the compressed texture, the partition defining one or more disjoint subsets into which the compressed texture block is to be unpacked. As noted above in the compression discussion, the partition defines the manner in which the uncompressed texture blocks were further subdivided into disjoint subsets prior to compression. Thus, the size and shape of the subsets must be determined before decompressing the subsets.

According to step 515, the data for each subset is then unpacked based on the determined partition. "Unpacking" refers to extracting the information from the block that is required to decompress the data stored in the subset. Finally, according to step 520, the subsets are independently decompressed to generate an approximation of the original texture block. Typically, the approximation would then be used by the GPUs texture mapping algorithm and applied to a rendered surface for display, but in some cases it could instead be used in further stages of processing.

Exemplary Embodiments

Described below are several exemplary embodiments of the above described compression methods. They include exemplary data structures and pseudo code for accomplishing the compression principles described above. The invention is not limited to these embodiments, but only by the scope of the appended claims. The skilled artisan could envision and implement variations on these embodiments without departing from the spirit and scope of the invention.

A first embodiment is a direct, higher quality replacement for DXTC compression. It compresses 24-bit RGB data to 4 bits per pixel. Punch-through alpha encoding from DXTC is also supported, where one of the indices in the data structure supports a fully transparent "black-pixel" for so-called "punch-through" textures. As illustrated below, the texture is divided into blocks of 8×8 pixels for compression. Each compressed block has a notional format described below. However, the exact details of the packing and storage will be implementation dependent, and could be reordered to make the hardware decompression as simple as possible. In this first embodiment, a texture block is subdivided into two, three, four or five subsets. The particular data structures are described more fully below.

Partition data structure with two subsets:

```
typedef union
{
  struct
  {
    unsigned int  blockType : 2;
    unsigned int  colour0:14, colour1:14, colour2:14, colour3:14;
    unsigned int  partitionBits : 6;
    unsigned int  t00:3, t01:3, t02:3, t03:3, t04:3;
    unsigned int  t05:3, t06:3, t07:3, t08:3, t09:3;
    unsigned int  t0a:3, t0b:3, t0c:3, t0d:3, t0e:3;
    unsigned int  t0f:3, t10:3, t11:3, t12:3, t13:3;
    unsigned int  t14:3, t15:3, t16:3, t17:3, t18:3;
    unsigned int  t19:3, t1a:3, t1b:3, t1c:3, t1d:3;
    unsigned int  t1e:3, t1f:3, t20:3, t21:3, t22:3;
    unsigned int  t23:3, t24:3, t25:3, t26:3, t27:3;
    unsigned int  t28:3, t29:3, t2a:3, t2b:3, t2c:3;
    unsigned int  t2d:3, t2e:3, t2f:3, t30:3, t31:3;
    unsigned int  t32:3, t33:3, t34:3, t35:3, t36:3;
    unsigned int  t37:3, t38:3, t39:3, t3a:3, t3b:3;
    unsigned int  t3c:3, t3d:3, t3e:3, t3f:3;
  } two PartitionMode;
```

Partition data structure with three subsets:

```
struct
{
  unsigned int  blockType : 2;
  unsigned int  colour0:20, colour1:20, colour2:20;
  unsigned int  colour3:20, colour4:20, colour5:20;
  unsigned int  partitionBits : 6;
  unsigned int  t00:2, t01:2, t02:2, t03:2, t04:2;
  unsigned int  t05:2, t06:2, t07:2, t08:2, t09:2;
  unsigned int  t0a:2, t0b:2, t0c:2, t0d:2, t0e:2;
  unsigned int  t0f:2, t10:2, t11:2, t12:2, t13:2;
  unsigned int  t14:2, t15:2, t16:2, t17:2, t18:2, t19:2;
  unsigned int  t1a:2, t1b:2, t1c:2, t1d:2, t1e:2, t1f:2;
  unsigned int  t20:2, t21:2, t22:2, t23:2, t24:2, t25:2, t26:2, t27:2;
  unsigned int  t28:2, t29:2, t2a:2, t2b:2, t2c:2, t2d:2, t2e:2, t2f:2;
  unsigned int  t30:2, t31:2, t32:2, t33:2, t34:2, t35:2, t36:2, t37:2;
  unsigned int  t38:2, t39:2, t3a:2, t3b:2, t3c:2, t3d:2, t3e:2, t3f:2;
} threePartitionMode;
```

Partition data structure with four subsets:

```
struct
{
  unsigned int  blockType : 2;
  unsigned int  colour0:15, colour1:15, colour2:15, colour3:15;
  unsigned int  colour4:15, colour5:15, colour6:15, colour7:15;
  unsigned int  partitionBits : 6;
  unsigned int  t00:2, t01:2, t02:2, t03:2, t04:2, t05:2, t06:2, t07:2;
  unsigned int  t08:2, t09:2, t0a:2, t0b:2, t0c:2, t0d:2, t0e:2, t0f:2;
  unsigned int  t10:2, t11:2, t12:2, t13:2, t14:2, t15:2, t16:2, t17:2;
  unsigned int  t18:2, t19:2, t1a:2, t1b:2, t1c:2, t1d:2, t1e:2, t1f:2;
  unsigned int  t20:2, t21:2, t22:2, t23:2, t24:2, t25:2, t26:2, t27:2;
  unsigned int  t28:2, t29:2, t2a:2, t2b:2, t2c:2, t2d:2, t2e:2, t2f:2;
  unsigned int  t30:2, t31:2, t32:2, t33:2, t34:2, t35:2, t36:2, t37:2;
  unsigned int  t38:2, t39:2, t3a:2, t3b:2, t3c:2, t3d:2, t3e:2, t3f:2;
} fourPartitionMode;
```

Partition with five subsets:

```
struct
{
  unsigned int blockType : 2;
  unsigned int colour0:12, colour1:12, colour2:12, colour3:12;
  unsigned int colour4:12, colour5:12, colour6:12, colour7:12;
  unsigned int colour8:12, colour9:12;
  unsigned int partitionBits : 6;
  unsigned int t00:2, t01:2, t02:2, t03:2, t04:2, t05:2, t06:2, t07:2;
  unsigned int t08:2, t09:2, t0a:2, t0b:2, t0c:2, t0d:2, t0e:2, t0f:2;
  unsigned int t10:2, t11:2, t12:2, t13:2, t14:2, t15:2, t16:2, t17:2;
  unsigned int t18:2, t19:2, t1a:2, t1b:2, t1c:2, t1d:2, t1e:2, t1f:2;
  unsigned int t20:2, t21:2, t22:2, t23:2, t24:2, t25:2, t26:2, t27:2;
  unsigned int t28:2, t29:2, t2a:2, t2b:2, t2c:2, t2d:2, t2e:2, t2f:2;
  unsigned int t30:2, t31:2, t32:2, t33:2, t34:2, t35:2, t36:2, t37:2;
  unsigned int t38:2, t39:2, t3a:2, t3b:2, t3c:2, t3d:2, t3e:2, t3f:2;
} fivePartitionMode;
}
```

With respect to the above described exemplary data structures, the <blockType> field has 2 fixed bits that indicate how many subsets are in the partition. The next field indicates the color endpoints for the subsets. In each case there are 2 colors stored explicitly per subset, so a partition having 2 subsets stores 4 colors, and a partition having five subsets stores 10 colors. Each data structure has 6 "partitionBits" that are used to choose a partition from a predefined set of 64 possible partition modes. Each <blockType> has its own set of 64 possible pre-defined partitions.

In practical terms, in order to simplify the decompression and make it cheaper, this first embodiment uses only one base set of 64 explicitly pre-defined partitions, defined for the 5-subset case, as illustrated in FIGS. 6A-D. One can then, for example, create tables for the partitions with fewer subsets by merging regions within this table—i.e., performing unions on the subsets within a partition. For example 4 subsets could be derived by merging subsets 4+3 together, while 3 subsets could be derived by merging subsets 4+3 together, and 0+1 together. Other combinations are, of course, possible. By deriving the partitions for all modes from the above table we can reduce the storage requirements for the tables in hardware.

Preferably, the colors for the partition subsets are reconstructed as follows: Each subset uses two of the explicitly defined colors that are directly mapped to the subset. In this embodiment the explicit colors are promoted from their base representation up to 8 bits-per-component by shifting and replication of the high bits to the low bits. That is, 8 bits each for Red, Green and Blue ("RGB 8.8.8") in what is referred to as "RGB" color space.

Colors are then generated for the subset by using the two explicit colors as the endpoints of a line in RGB color space. The remaining (implicit) colors are evenly distributed along that line. For higher quality in this embodiment it is desirable for the implicit colors to be derived at higher precision than the endpoints—ie. more than 8 bits-per-component. Each pixel or texel in the subset has an index that looks up which color to use from the line. Each subset can use one of two different distributions of the implicit colors relative to the endpoints along the line. We will, in future, refer to these different distributions as colour ramps—the ramp consists of the endpoints and the distributed colours. Which ramp to use is decided by treating the endpoints as unsigned numbers and performing the following simple comparison: IF(colour0<colour1) use ramp 0 ELSE use ramp 1. Finally, exact color derivations are defined in the sections on each data structure below.

For example, in the partition with two subsets, four colors are stored at 14 bits of precision (RGB 5.5.4). Each texel or pixel index is 3 bits, so the ramps have 8 positions. The ramp derivation is as follows:

```
unsigned BYTE c[8][4];
if(colour0 > colour1)
{
  c[0] = colour0;
  c[7] = colour1;
  // Set alpha to 1.0
  c[0][0] = 0xff;
  c[7][0] = 0xff;
  for(i=0;i<4;i++)
  {
    c[1][i] = (6*c[0][i] + 1*c[7][i] + 3) / 7;
    c[2][i] = (5*c[0][i] + 2*c[7][i] + 3) / 7;
    c[3][i] = (4*c[0][i] + 3*c[7][i] + 3) / 7;
    c[4][i] = (3*c[0][i] + 4*c[7][i] + 3) / 7;
    c[5][i] = (2*c[0][i] + 5*c[7][i] + 3) / 7;
    c[6][i] = (1*c[0][i] + 6*c[7][i] + 3) / 7;
  }
}
else
{
  c[0] = colour0;
  c[7] = colour1;
  // Set alpha to 1.0
  c[0][0] = 0xff;
  c[7][0] = 0xff;
  for(i=0;i<4;i++)
  {
    c[1][i] = (5*c[0][i] + 1*c[7][i] + 2) / 6;
    c[2][i] = (4*c[0][i] + 2*c[7][i] + 2) / 6;
    c[3][i] = (3*c[0][i] + 3*c[7][i] + 2) / 6;
    c[4][i] = (2*c[0][i] + 4*c[7][i] + 2) / 6;
    c[5][i] = (1*c[0][i] + 5*c[7][i] + 2) / 6;
  }
  // Colour 6 is treated as transparent
  c[6] = transparent; c[6][0] = 0;
}
```

In the above example, each pixel in a subset is represented by a 3-bit index into the color set.

In the partition with three subsets, alternatively, six colors may be stored at 20 bits of precision (RGB 7.7.6). Each texel index is 2 bits, so the ramps have 4 positions. The ramp derivation is as follows:

```
unsigned BYTE c[4][4];
if(colour0 > colour1)
{
  c[0] = colour0;
  c[4] = colour1;
  // Set alpha to 1.0
  c[0][0] = 0xff;
  c[4][0] = 0xff;
  for(i=0;i<4;i++)
  {
    c[1][i] = (2*c[0][i] + 1*c[4][i] + 1) / 3;
    c[2][i] = (1*c[0][i] + 2*c[4][i] + 1) / 3;
  }
}
else
{
  c[0] = colour0;
  c[4] = colour1;
  // Set alpha to 1.0
  c[0][0] = 0xff;
  c[4][0] = 0xff;
  for(i=0;i<4;i++)
  {
    c[1][i] = (c[0][i] + c[4][i] + 1) / 2;
  }
  // Colour 3 is treated as transparent
  c[3] = transparent; c[3][0] = 0;
}
```

In the above example, each pixel in the subset is represented by a 2-bit index into the color set.

In the partition with four subsets, eight colors are stored at 15 bits of precision (RGB 5.5.5). Each pixel is represented by a 2 bit index into the color set. The color derivation is the same as for the 3 partition mode. Similarly, in the partition with five subsets, ten colors are stored at 12 bits of precision (RGB 4.4.4) and the texel representations work as in the four subset mode.

It should be noted that the optimal set of partitions for the format will be determined by the user and the nature of the application. One skilled in the art will recognize that it is impossible for one set of partitions to be totally optimal across all images.

Image Quality Versus DXT1

The above described first embodiment was tested against S3 Graphics' DXT1 (sometimes also called DXTn or DXTC) using the 64 partition set described in FIG. 6. The tests revealed that this embodiment gives a higher quality compression than DXT1 on all images tested, both in terms of measured RMS error and perceived image quality. Taking the Root Mean Square (RMS) error as the basic quality parameter, the gains achieved range from a typical low-bar of 10-15% reduction of total RMS error to a high range of 50% reduction or more.

The low-range RMS improvements are typically found on more photorealistic textures, but even in cases where there is a relatively small improvement in overall RMS, the above described embodiment can give significantly better perceived quality as it improves on some of DXT1s most noticeable quality problems, noticeably its tendencies towards introducing low-frequency noise (or 'blocking') and bleeding colors from one region to another. The largest improvements in RMS tend to occur on non-photorealistic textures such as cartoons, or items like "heads-up displays," where the above described embodiment usually gives a very significant improvement in visual quality.

The variable partition scheme described above is superior in terms of RMS error. Additionally, it also provides noticeable improvement in perceived quality and eliminates some image artifacts almost completely. The table below illustrates some test results for various types of images.

| Image Name | Image Description | DXT1 | 4bpp partition |
|---|---|---|---|
| | | Weighted RMS Error $R = 0.3086$; $G = 0.6094$, $B = 0.082$ | |
| 4.2.03 | Photographic; noisy | 5.97 | 2.86 |
| 17 | Computer display | 7.28 | 5.6 |
| Dialog 1 | Cartoon | 5.55 | 3.28 |

-continued

| Image Name | Image Description | Weighted RMS Error R = 0.3086; G = 0.6094, B = 0.082 | |
| --- | --- | --- | --- |
| | | DXT1 | 4bpp partition |
| Lena | Photographic portrait | 3.74 | 2.82 |
| Ring | Artificial, concentric gradients with varying frequency | 12.71 | 6.29 |
| Smart | Photographic, complex Color regions | 7.8 | 5.57 |

Image Quality Versus Other Compression Methods

In testing, the above described embodiment consistently produces higher quality images than the other compression methods discussed in the introduction to this document, such as palletisation and vector quantization. Comparing schemes at the same compression rate has shown the above embodiment to be of higher quality in terms of RMS error and subjective quality than other fixed-rate compression formats. It also adapts very well to a wide variety of input image types, and largely doesn't depend on one particular type of input data (e.g., photographic) to produce high quality compression—some of other compression methods discussed perform reasonably well on a subset of images, but break down when given a wider range of data.

Alternative Embodiments

A second embodiment is intended as a direct replacement for DXT5. Its data structure is similar to the first embodiment described above and DXT1. It uses the same color encoding as the first embodiment, but each 8×8 color block is accompanied by an 8×8 alpha block with the following format:

```
struct
{
  unsigned int  alpha0:8;
  unsigned int  alpha1:8;
  unsigned int  alpha2:8;
  unsigned int  alpha3:8;
  unsigned int  alpha4:8;
  unsigned int  alpha5:8;
  unsigned int  alpha6:8;
  unsigned int  alpha7:8;
  unsigned int  t00:3, t01:3, t02:3, t03:3, t04:3, t05:3, t06:3, t07:3;
  unsigned int  t08:3, t09:3, t0a:3, t0b:3, t0c:3, t0d:3, t0e:3, t0f:3;
  unsigned int  t10:3, t11:3, t12:3, t13:3, t14:3, t15:3, t16:3, t17:3;
  unsigned int  t18:3, t19:3, t1a:3, t1b:3, t1c:3, t1d:3, t1e:3, t1f:3;
  unsigned int  t20:3, t21:3, t22:3, t23:3, t24:3, t25:3, t26:3, t27:3;
  unsigned int  t28:3, t29:3, t2a:3, t2b:3, t2c:3, t2d:3, t2e:3, t2f:3;
  unsigned int  t30:3, t31:3, t32:3, t33:3, t34:3, t35:3, t36:3, t37:3;
  unsigned int  t38:3, t39:3, t3a:3, t3b:3, t3c:3, t3d:3, t3e:3, t3f:3;
} APC2_ALPHA_BLOCK;
```

The alpha block is subdivided into subsets as with the color block, but there are no explicit partitioning bits used in the format. Instead, the endpoints are ordered for each subset in the partition to derive the 4 bits chosen from a table of 16 possible partitions.

For alpha encoding, a lower number of subsets per partitions are acceptable because the quality gains from additional subsets rapidly reaches diminishing returns due to the generally high quality of the basic compression scheme. Avoiding explicit partition bits allows the precision of the endpoints to be kept as high as in DXT5. The 6-interpolant encoding with explicit 0 and 1 is no longer used, but this loss is generally more than offset by the addition of pre-compression partitioning. Alpha derivation should typically have at least 12 bits of fractional precision retained. Although the old DXT5 only required 8-bits of precision for the derivation, it is more flexible to allow the format to use the full potential precision of the interpolated values.

For the color block, decoding in the above described formats typically means that transparent punch-through alpha encoding is no longer required. However, the ability to decode to either 3 or 4 colors for each subset in the partition could make a quality difference. As detailed below, there are a number of possible extensions to this second embodiment format.

One example is an alpha extension. As noted above, the number of partitions for the color block for the first embodiment was limited to only 64 possibilities, leaving only two "spare" bits. In the format of this second embodiment, one additional possibility is to make use of these two bits to decide on a per-block basis which channel is represented in the alpha block. Given the two bits we have four possibilities—

0—Colour block contains RGB, Alpha block contains A
1—Colour Block contains AGB, Alpha block contains R
2—Colour block contains RAB, Alpha block contains G
3—Colour block contains RGA, Alpha block contains B After decoding the channels would be swizzled back into the normal order. By selecting different swizzles for each block, significant improvements in compression quality are possible.

Third through sixth embodiments differ from the above described first embodiment in that they compress a different number of components—i.e., instead of compressing three color components in RGB space, they compress a single component or other texture variable. A third embodiment, for example, is a 1-component compressed format for single channel data. It uses the same compression as the alpha block in the second embodiment and allows compression of original data with around 12-bits of precision to 4-bits.

A fourth embodiment is a 2-component compressed format. It is the substantially similar to ATI2N/3DC compression (developed by ATI Technologies), and uses the same block format for each component as the above described third embodiment.

A fifth embodiment is a 4-component compressed format using the same block format for each component as the third embodiment.

A sixth embodiment format is designed for developers who require higher quality compression than that provided by the above described first embodiment. It compresses to 8-bits per pixel (compared to the first embodiment at 4-bits per pixel), but the compressed texture quality is much higher, and the format can handle images with 3 or 4 channels. Textures compressed with this sixth embodiment are generally nearly indistinguishable from the uncompressed source texture. The principles of the sixth embodiment are very similar to the first embodiment, but works by compressing 4×4 pixel blocks.

In the sixth embodiment, each block contains either two or three subsets per partition.

```
typedef union
{
  struct
  {
    unsigned int blockType : 1;
    unsigned int colour0:19;
```

```
        unsigned int t0:3;
        unsigned int t1:3;
        unsigned int t2:3;
        unsigned int t3:3;
        unsigned int partitionBit0:1;
        unsigned int colour1:19;
        unsigned int t4:3;
        unsigned int t5:3;
        unsigned int t6:3;
        unsigned int t7:3;
        unsigned int partitionBit1:1;
        unsigned int colour2:19;
        unsigned int t8:3;
        unsigned int t9:3;
        unsigned int tA:3;
        unsigned int tB:3;
        unsigned int partitionBit2:1;
        unsigned int colour3:19;
        unsigned int tC:3;
        unsigned int tD:3;
        unsigned int tE:3;
        unsigned int tF:3;
    } twoPartitionMode;
    struct
    {
        unsigned int blockType : 1;
        unsigned int colour0:13;
        unsigned int t0:3;
        unsigned int t1:3;
        unsigned int t2:3;
        unsigned int t3:3;
        unsigned int t4:3;
        unsigned int t5:3;
        unsigned int colour1:13;
        unsigned int colour2:13;
        unsigned int t6:3;
        unsigned int t7:3;
        unsigned int colour3:13;
        unsigned int colour4:13;
        unsigned int t8:3;
        unsigned int t9:3;
        unsigned int colour5:13;
        unsigned int tA:3;
        unsigned int tB:3;
        unsigned int tC:3;
        unsigned int tD:3;
        unsigned int tE:3;
        unsigned int tF:3;
        unsigned int partitionBit:1;
    } threePartitionMode;
    DWORD rawData[4];
} OPC8_BLOCK;
```

The <blockType> specifies if the data structure contains two or three subsets per partition. There is no transparency encoding, and the color ramps always have 8 points. As illustrated, the sixth embodiment has a number of different partitions.

For a two subset partition, the data structure contains four endpoints, specified at 19 bits (RGB 6.7.6) precision. The index size is three bits and there are 32 possible partitions, selected in some fashion similar to the following:

partition=(block→colour0>block→colour1)? 0x1:0;
    partition|=(block→colour2>block→colour3)? 0x2:0;
    partition|=(block→partitionBit0)? 0x4:0;
    partition|=(block→partitionBit1)? 0x8:0;
    partition|=(block→partitionBit2)? 0x10:0;

For a three subset partition, the data structure contains six endpoints, specified at 13 bits (RGB 4.5.4) precision. The index size is three bits. There are 16 possible block partitions, selected in some fashion similar to the following:

partition=(block→partitionBit)? 0x1:0;
    partition=(block→colour0>block→colour1)? 0x2:0;
    partition|=(block→colour2>block→colour3)? 0x4:0;
    partition|=(block→colour4>block→colour5)? 0x8:0;

An implementation of the sixth embodiment has been tested and shown to give quality levels that on most 3-channel (RGB) textures can be considered 'perceptually lossless.' In other words, if the compressed and uncompressed representations are compared side-by-side, it can be difficult for an observer to determine which is which, even when magnified and subjected to close scrutiny. Preservation of detail and color is extremely good, and noticeable artifacts are very rare. The compression quality is high on both real-world and artificial images, when comparing the sixth embodiment to DXT1, RMS error on the 3-channel textures is typically reduced by at least 50%, and more commonly by 70% or more. While normal map—i.e., a map of surface normals—compression can also potentially be achieved with this format, the quality is not as high as other alternatives (3DC/BC5).

CONCLUSION

While various embodiments of the present invention have been described above, it should be understood that they have been presented by way of example only, and not limitation. Note that numerous features described above can be implemented in data compression schemes outside the field of texture compression. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing texture decompression comprising:
    receiving a compressed texture block, wherein the compressed texture block includes two or more disjoint subsets into which data in the compressed texture block is to be unpacked, wherein the two or more disjoint subsets include a first subset having a first set of color endpoints and a second subset having a second set of color endpoints; and
    individually decompressing each of the two or more disjoint subsets to form texels, wherein the decompressing includes:
        determining a first texel color for a first texel that is part of the first disjoint subset by interpolating between color endpoints of the first set of color endpoints based on a first index value for the first texel; and
        determining a second texel color for a second texel that is part of the second disjoint subset by interpolating between color endpoints of the second set of color endpoints based on a second index value for the second texel.

2. The method of claim 1, wherein the compressed texture block represents the original texture block.

3. The method of claim 1, wherein the one or more disjoint subsets have different sizes.

4. The method of claim 1, wherein the decompressing each of the one or more disjoint subsets is performed independently.

5. The method of claim 1 further comprising applying the approximation to a rendered surface for display.

6. The method of claim 1, wherein each of the one or more disjoint subsets is associated with a quality parameter that met a pre-selected threshold.

7. A computer processing system comprising:
a processor and a memory, wherein the processor is configured to:
receive a compressed texture block, wherein the compressed texture block includes two or more disjoint subsets into which data in the compressed texture block is to be unpacked, wherein the two or more disjoint subsets include a first subset having a first set of color endpoints and a second subset having a second set of color endpoints; and
individually decompress each of the two or more disjoint subsets to form texels, wherein the decompressing includes:
determining a first texel color for a first texel that is part of the first disjoint subset by interpolating between color endpoints of the first set of color endpoints based on a first index value for the first texel; and
determining a second texel color for a second texel that is part of the second disjoint subset by interpolating between color endpoints of the second set of color endpoints based on a second index value for the second texel.

8. The computer processing system of claim 7, wherein the compressed texture block represents the original texture block.

9. The computer processing system of claim 7, wherein the one or more disjoint subsets have different sizes.

10. The computer processing system of claim 7, wherein the processor is further configured to independently decompress each of the one or more disjoint subsets.

11. The computer processing system of claim 7, wherein the processor is further configured to apply the approximation to a rendered surface for display.

12. The computer processing system of claim 7, wherein each of the one or more disjoint subsets is associated with a quality parameter that met a pre-selected threshold.

\* \* \* \* \*

UNITED STATES PATENT AND TRADEMARK OFFICE
CERTIFICATE OF CORRECTION

| | |
|---|---|
| PATENT NO. | : 11,184,628 B2 |
| APPLICATION NO. | : 16/257500 |
| DATED | : November 23, 2021 |
| INVENTOR(S) | : Iourcha et al. |

It is certified that error appears in the above-identified patent and that said Letters Patent is hereby corrected as shown below:

In the Claims

In Claim 3, at Column 16, Line 58; after the word "the", please delete the word "one" and insert therefor --two--.

In Claim 4, at Column 16, Line 61; after the word "the", please delete the word "one" and insert therefor --two--.

In Claim 6, at Column 16, Line 65; after the word "the", please delete the word "one" and insert therefor --two--.

In Claim 9, at Column 18, Line 8; after the word "the", please delete the word "one" and insert therefor --two--.

In Claim 10, at Column 18, Line 11; after the word "the", please delete the word "one" and insert therefor --two--.

In Claim 12, at Column 18, Line 16; after the word "the", please delete the word "one" and insert therefor --two--.

Signed and Sealed this
Twenty-second Day of November, 2022

*Katherine Kelly Vidal*

Katherine Kelly Vidal
*Director of the United States Patent and Trademark Office*